United States Patent
Choong et al.

(10) Patent No.: US 11,733,672 B2
(45) Date of Patent: Aug. 22, 2023

(54) RECOATER COLLISION PREDICTION AND CORRECTION METHOD FOR ADDITIVE MANUFACTURING AND SYSTEM THEREOF

(71) Applicant: Industrial Technology Research Institute, Hsinchu (TW)

(72) Inventors: Wai-Kwuen Choong, Tainan (TW); Kai-Yuan Teng, Chiayi County (TW); Ching-Chih Lin, Tainan (TW); I-Chun Lai, Tainan (TW); Tsung-Wen Tsai, New Taipei (TW); De-Yau Lin, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 279 days.

(21) Appl. No.: 17/105,505

(22) Filed: Nov. 26, 2020

(65) Prior Publication Data
US 2022/0163943 A1    May 26, 2022

(51) Int. Cl.
*G05B 19/4061*    (2006.01)
*G06F 30/20*    (2020.01)
(Continued)

(52) U.S. Cl.
CPC .......... *G05B 19/4061* (2013.01); *B33Y 50/00* (2014.12); *G06F 30/20* (2020.01);
(Continued)

(58) Field of Classification Search
CPC ...... G05B 19/4061; G05B 2219/33286; G05B 2219/40339; G05B 2219/49008;
(Continued)

(56) References Cited

U.S. PATENT DOCUMENTS 7,754,135 B2    7/2010  Abe et al.
11,511,486 B2 *  11/2022  Kothari ................. B29C 64/209
(Continued)

FOREIGN PATENT DOCUMENTS

CN    108062432    5/2018
CN    106273495    10/2018
(Continued)

OTHER PUBLICATIONS

"Tutorial 7: To Predict Recoater Interference," retrieved on Nov. 17, 2020, Available at: https://knowledge.autodesk.com/support/netfabb/learn-explore/caas/CloudHelp/cloudhelp/2021/ENU/NETF-Utility-Simulation/files/GUID-FB1949F9-F748-12EA-82AF-E6276BA397E8-htm.html, pp. 1-8.
(Continued)

*Primary Examiner* — Chad G Erdman
(74) *Attorney, Agent, or Firm* — JCIPRNET

(57) ABSTRACT

A recoater collision prediction and calibration method for additive manufacturing and a system thereof are provided. The recoater collision prediction and calibration method includes the following steps: loading a printing image file to generate a simulated printing object according to the printing image file; performing a process thermal stress simulation on the simulated printing object to obtain a plurality of simulated deformation variables respectively corresponding to a plurality of prediction results of the simulated printing object in a vertical direction on each layer; obtaining an experimental collision height of an experimental printed object; selecting one of the plurality of simulated deformation variables according to the experimental collision height; calculating a recoater tolerance according to the one of the plurality of simulated deformation variables; calibrating a collision risk formula according to the recoater tolerance; and predicting a collision risk value between the simulated
(Continued)

printing object and a recoater according to the collision risk formula.

20 Claims, 8 Drawing Sheets

(51) Int. Cl.
*B33Y 50/00* (2015.01)
*G06F 113/10* (2020.01)
*G06F 119/08* (2020.01)

(52) U.S. Cl.
CPC .............. *G05B 2219/33286* (2013.01); *G05B 2219/40339* (2013.01); *G05B 2219/49008* (2013.01); *G06F 2113/10* (2020.01); *G06F 2119/08* (2020.01)

(58) Field of Classification Search
CPC ..... G05B 19/4099; B33Y 50/00; G06F 30/20; G06F 2113/10; G06F 2119/08
See application file for complete search history.

(56) References Cited

U.S. PATENT DOCUMENTS

| | | | |
|---|---|---|---|
| 2018/0029300 A1* | 2/2018 | Batchelder | ............ B29C 64/153 |
| 2018/0349530 A1* | 12/2018 | Antoine | ................ B29C 64/153 |
| 2020/0122389 A1 | 4/2020 | Binek et al. | |
| 2020/0164438 A1 | 5/2020 | DeMuth et al. | |
| 2021/0370608 A1* | 12/2021 | Rossmann | .............. G06F 30/23 |

FOREIGN PATENT DOCUMENTS

| | | |
|---|---|---|
| CN | 110340354 | 10/2019 |
| CN | 111406234 | 7/2020 |
| EP | 3646968 | 5/2020 |
| TW | 201946767 | 12/2019 |
| TW | 202021787 | 6/2020 |
| WO | 2019094472 | 5/2019 |

OTHER PUBLICATIONS

Amphyon 2019 Documentation, Feb. 4, 2021, pp. 43-44.
"Office Action of Taiwan Counterpart Application", dated Aug. 4, 2021, p. 1-p. 6.

* cited by examiner

RECOATER COLLISION PREDICTION AND CORRECTION METHOD FOR ADDITIVE MANUFACTURING AND SYSTEM THEREOF

BACKGROUND

Technical Field

The disclosure relates to a risk assessment technology, and in particular relates to a recoater collision prediction and calibration method for additive manufacturing and a system thereof.

Description of Related Art

With the evolution of manufacturing technology, additive manufacturing is currently an important development goal in the field of the additive manufacturing. However, the current problems encountered in the additive manufacturing are: when the recoater of a printing device for additive manufacturing is performing the operation of powder spreading layer by layer on a printing layer, the printed object is deformed after the printed object is heated, the height of the uppermost layer of the printed object becomes different from the preset height of the printing device, and as a result, the recoater collides with the deformed printed object in the process of powder spreading layer by layer on the printing layer. Nevertheless, the collision between the recoater and the printed object results in rapid decrease of the lifetime of the recoater. In view of this, the following solutions of several embodiments are proposed to improve the collision probability between the recoater and the printed object.

SUMMARY

The disclosure provides a recoater collision prediction and calibration method for additive manufacturing and a system thereof capable of effectively assessing and improving the collision risk between a printing device and a printed object in an additive manufacturing process.

The recoater collision prediction and calibration method for additive manufacturing in the disclosure includes the following steps: loading a printing image file to generate a simulated printing object according to the printing image file; performing a process thermal stress simulation on the simulated printing object to obtain a plurality of simulated deformation variables corresponding to a plurality of prediction results of the simulated printing object in a vertical direction on each layer; obtaining an experimental collision height of an experimental printed object colliding with a recoater; selecting one of the plurality of the simulated deformation variables according to the experimental collision height; calculating a recoater tolerance according to one of the plurality of the simulated deformation variables; calibrating a collision risk formula according to the recoater tolerance; and predicting a collision risk value between the simulated printing object and the recoater according to the collision risk formula.

The recoater collision prediction and calibration system for additive manufacturing in the disclosure includes a memory and a processor. The memory is adapted for storing a simulating module and a computing module. The processor is coupled to the memory and adapted to execute the simulating module and the computing module to perform the following operations. The processor loads a printing image file to generate a simulated printing object according to the printing image file. The processor performs a process thermal stress simulation on the simulated printing object to obtain a plurality of simulated deformation variables corresponding to a plurality of prediction results of the simulated printing object in a vertical direction on each layer. The processor obtains an experimental collision height of an experimental printed object colliding with a recoater. The processor selects one of the plurality of the simulated deformation variables according to the experimental collision height. The processor calculates a recoater tolerance according to the one of the plurality of the simulated deformation variables. The processor calibrates a collision risk formula according to the recoater tolerance. The processor predicts a collision risk value between the simulated printing object and the recoater according to the collision risk formula.

Based on the above, in the disclosure, the recoater collision prediction and calibration method for additive manufacturing and the system thereof are capable of calibrating a collision risk formula through simulations and experiments, so as to effectively predict the collision risk between the recoater and the printed object in the additive manufacturing process.

In order to make the aforementioned features and advantages of the disclosure comprehensible, embodiments accompanied with drawings are described in detail below.

DESCRIPTION OF THE EMBODIMENTS

Figure 1:
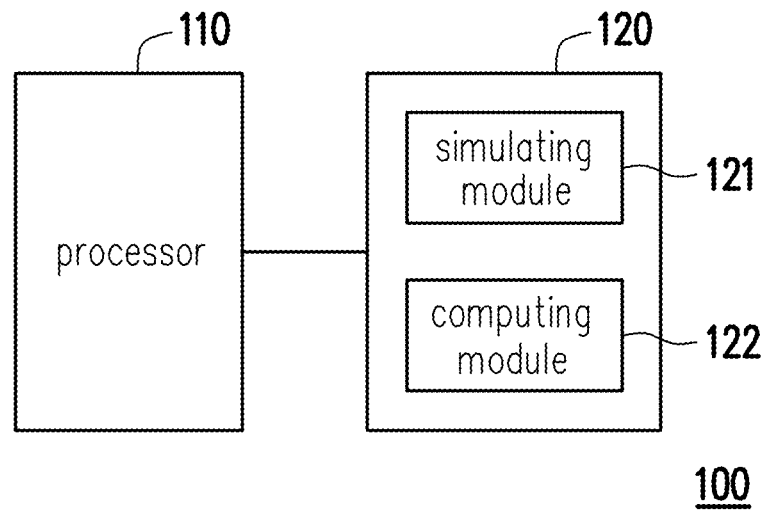
FIG. 1 is a schematic view of a recoater collision prediction and calibration system according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a schematic view of a recoater collision prediction and calibration system according to an embodiment of the disclosure. Referring to FIG. 1, a recoater collision prediction and calibration system 100 includes a processor 110 and a memory 120. The memory 120 includes a simulating module 121 and a computing module 122. In the embodiment, the recoater collision prediction and calibration system 100 is an electronic device. For example, it is used in devices, such as personal computers (PCs), notebook computers, industrial PCs (IPCs) or cloud servers, etc., digital systems or cloud platforms, or in the form of software programs installed in the foregoing computer devices, for the user to operate the computer devices to automatically perform the relevant simulation, calculation, and analysis operations proposed in the embodiments of the disclosure, so as to achieve the collision prediction and calibration between the recoater and the printed object in the printing process of additive manufacturing.

In the embodiment, for example, the processor 110 is a central processing unit (CPU), or another programmable general-purpose or special-purpose microprocessor, a digital signal processor (DSP), a programmable controller, an application specific integrated circuit (ASIC), a programmable logic device (PLD) or another similar apparatus or a combination of the apparatuses. The memory 120, for example, may be a dynamic random access memory (DRAM), a flash memory, or a non-volatile random access memory (NVRAM), etc.

In the embodiment, the memory 120 is pre-stored with the simulating module 121 and the computing module 122 and further loads or stores data, such as the parameter data, the printing image files, and the simulated printing objects in the embodiments of the disclosure for the processor 110 to access and execute. Note that in one embodiment, the simulating module 121 and the computing module 122 may also be stored in a non-transitory computer-readable storage medium, so that the recoater collision prediction and calibration in the embodiments of the disclosure is realized by loading the simulating module 121 and the computing module 122 into the computer device.

Figure 2:
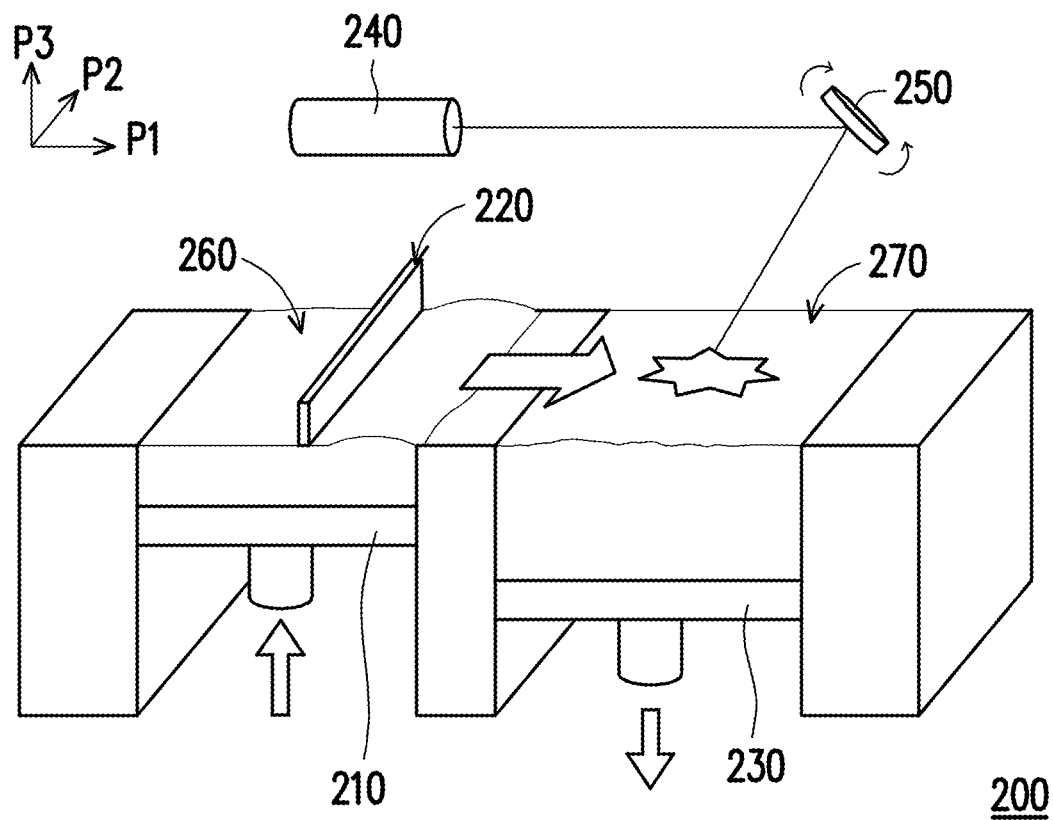
FIG. 2 is a schematic view of the printing operation of a printing device according to an embodiment of the disclosure.

FIG. 2 is a schematic view of the printing operation of a printing device according to an embodiment of the disclosure. Referring to FIG. 1 and FIG. 2, the recoater collision prediction and calibration system 100 is electrically connected to a printing device 200. The printing device 200 is adapted for additive manufacturing. In the embodiment, the recoater collision prediction and calibration system 100 is adapted for the printing device 200 to precorrect the printing image file before the actual printing operation. Moreover, after the precorrection of the printing image file is completed, the printing device 200 operates independently without being connected to the recoater collision prediction and calibration n system 100 and performs the printing operation according to the precorrected printing image file. In the embodiment, the printing device 200 includes lifting platforms 210 and 230, a recoater 220, a laser light source 240, and a reflector 250. The printing device 200 further includes related driving devices and circuits for driving the lifting platforms 210 and 230, the recoater 220, the laser light source 240, and the reflector 250. The printing device 200 is disposed on a plane (a horizontal plane) formed by extending along directions P1 and P2. Powder 260 is disposed on the lifting platform 210, and the recoater 220 moves along the direction P2 to spread the powder to the lifting platform 230.

Note that the recoater 220 sequentially spread the powder 260 from the lifting platform 210 to the lifting platform 230 along the direction P1 (the horizontal direction). Before each spreading process of the powder 260, the lifting platform 210 is moved up along the direction P3 (the vertical direction) so that the recoater 220 spreads at least a part of the powder 260; and the lifting platform 230 is moved down along a direction opposite to the direction P3, so that the recoater 220 spreads the at least a part of the powder 260 to above the uppermost layer (i.e., powder 270), the previous heated layer of the printed object on the lifting platform 230. Then, the laser light source 240 emits laser light, and the laser light heats at least a part of the powder 270 on the lifting platform 230 through the rotation or movement of the reflector 250 to draw the printed object. In this regard, since the semi-finished printed object may be deformed after the powder 270 being heated and consolidated on the uppermost layer of the current printing, the recoater 220 may collide with the deformed printed object when moving above the lifting platform 230 along the direction P2 to spread powder, resulting in damages to the recoater or reduction of its lifetime. Therefore, the recoater collision prediction and calibration system 100 in the disclosure is adapted to predict the collision between the recoater 220 and the printed object, and then reduce the probability of collision between the recoater 220 and the printed object by adjusting the layer thickness of the printed object or the size of the supporting object. Moreover, the powder 260 and the powder 270, for example, may be metal, plastic, ceramic, or a mixture thereof, and the disclosure is not limited thereto.

Figure 3:
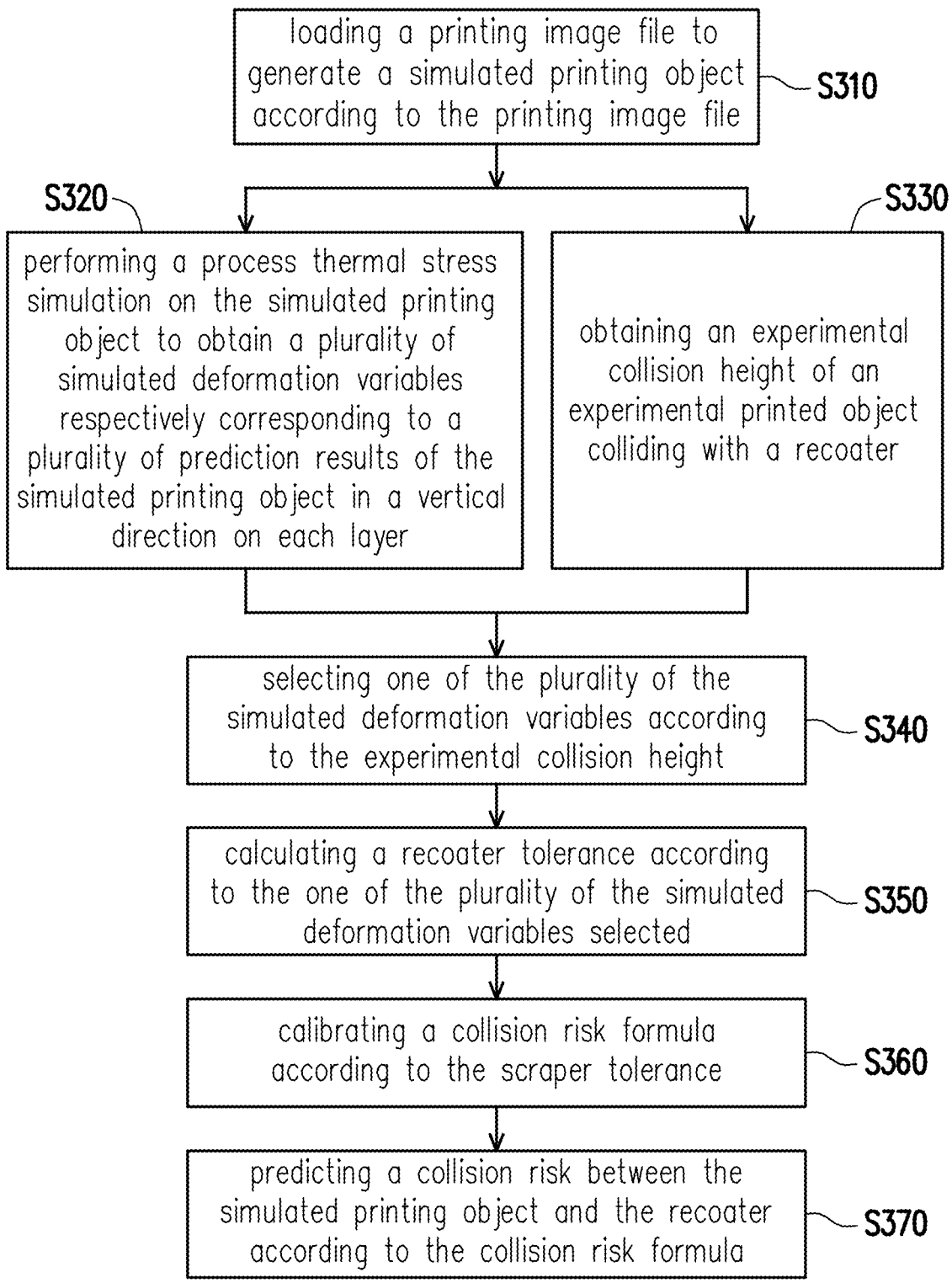
FIG. 3 is a flowchart of a recoater collision prediction and calibration method according to an embodiment of the disclosure.
Figure 4A:
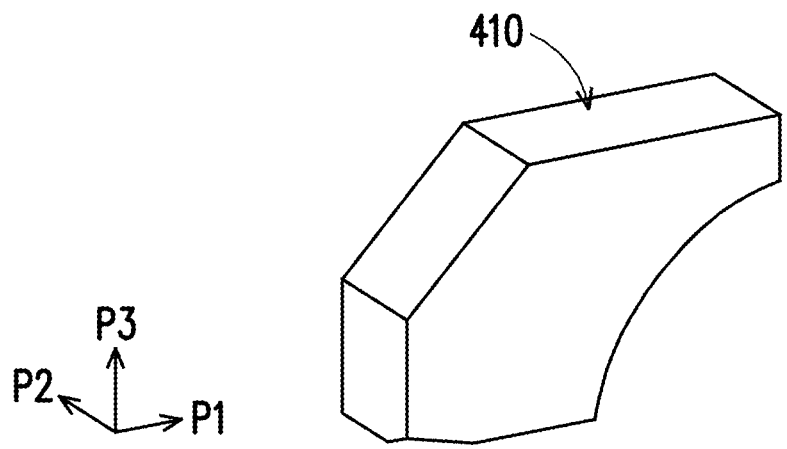
FIG. 4A is a schematic view of a simulated printing object according to an embodiment of the disclosure.
Figure 4B:
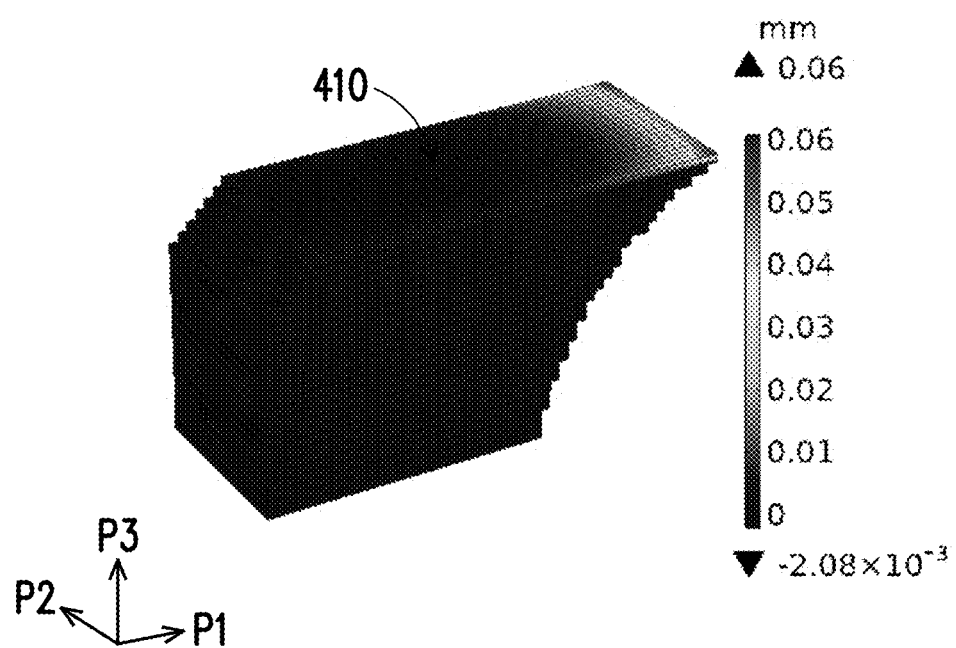
FIG. 4B is a schematic view of the prediction results of a plurality of simulation printing layers according to an embodiment of the disclosure.

FIG. 3 is a flowchart of a recoater collision prediction and calibration method according to an embodiment of the disclosure. FIG. 4A is a schematic view of a simulated printing object according to an embodiment of the disclosure. FIG. 4B is a schematic view of the prediction results of a plurality of simulation printing layers according to an embodiment of the disclosure. Referring to FIG. 1 to FIG. 4B, in the embodiment, the recoater collision prediction and calibration system 100 performs the following steps S310 to S370 to realize the collision prediction. In step S310, the processor 100 loads a printing image file to generate a simulated printing object 410 as shown in FIG. 4A according to the printing image file. In step S320, the processor 110 performs a process thermal stress simulation on the simulated printing object 410 to obtain a plurality of simulated deformation variables respectively corresponding to a plurality of prediction results of the simulated printing object 410 in a vertical direction on each layer of the simulated printing layers (simulated numerical layers). In the embodiment, the simulated printing layer corresponds to the numerical layer in the simulation analysis, and each of the plurality of prediction results corresponds to the simulation result of the instantaneous build height of each simulated printing layer during actual manufacturing. As shown in FIG. 4B, the processor 110 obtains a simulated deformation variable ($U_z$) corresponding to each simulated printing layer in the vertical direction from the prediction result. The simulated deformation variable ($U_z$) is the deformation variable of the uppermost surface in the vertical direction when simulating each layer. As shown in FIG. 4B, the color distribution of each simulated printing layer of the simulated printing object 410 may be different because the deformation degree of each simulated printing layer is different due to selective heating, and the simulated deformation variable ($U_z$) respectively corresponding to each simulated printing layer in the vertical direction may be different.

In the embodiment, the process thermal stress simulation performed by the processor 110 on the simulated printing object 410 is a quasi-static simulation. The simulation results of each simulated printing layer of the simulated printing object 410 vary with the (simulated) instantaneous build heights of the simulated printing object 410 (or with different time points in the process simulation). The processor 110 uses the (simulated) instantaneous build height of the printed object 410 as the main variable. For example, assuming that the simulated printing object 410 in the simulation has 40 simulated printing layers, and the thickness of each simulated printing layer is, for example, 1 millimeter (mm), during the simulation process (at a certain simulation time point), when the processor 110 currently finishes simulating the fifth layer (the molding height of 5 mm/40 mm), the processor 110, for example, obtains the deformation variables of the volume of the molding semi-finished product (i.e., the first to fifth layers) at all positions. Moreover, at the current simulation time point, the deformation variable of the uppermost layer of the fifth layer (as the simulated uppermost layer) of the simulated printing object 410 in a vertical direction P3 is the important physical quantity in the disclosure (i.e., the calibration basis for the related printing parameters, process parameters, or the recoater tolerance of the printing device 200 for each layer of the printed object in the printing image file in the following embodiments).

In step S330, the processor 110 obtains an experimental collision height ($h_{exp}^C$) from an experiment that a sample printed object is set to collide with a recoater. As shown in FIG. 2, the recoater collision prediction and calibration system 100 actually performs a printing experiment before the printing device 200 actually prints the experimental printed object. Moreover, when the recoater 220 collides with the experimental printed object, the processor 110 obtains the experimental collision height ($h_{exp}^C$). In step S340, the processor 110 selects one of the plurality of the simulated deformation variables according to the experimental collision height ($h_{exp}^C$). In the embodiment, the processor 110 obtains a simulated collision height ($h_{sim}^C$) that is the closest to its height according to the experimental collision height ($h_{exp}^C$) according to formula (1). In the formula, dz is the layer thickness of the simulated printing layer. Next, the processor 110 selects a maximum value $$\text{Max}[U_{z|h=h_{sim}^C}]$$

from a current vertical deformation variable $$(U_{z|h=h_{sim}^C})$$

of the upper surface of the simulated collision height $h_{sim}^C$ when the manufacturing height is equal to the simulated collision height during simulating.

$$|h_{exp}^C - h_{sim}^C| < dz \qquad \text{Formula (1)}$$

In step S350, the processor 110 calculates a recoater tolerance (collision) ($t_{r,c}$) according to a selected simulated vertical deformation variable $$(\text{Max}[U_{z|h=h_{sim}^C}]).$$

In the embodiment, the processor 110 calculates the recoater tolerance ($t_{r,c}$) according to formula (2), where $h_l$ is the actual process layer thickness.

$$t_{r,c} = \frac{\text{Max}[U_{z|h=h_{sim}^C}]}{d_l} - 1 \qquad \text{Formula (2)}$$

In step S360, the processor 110 calibrates a collision risk formula as formula (3) according to the recoater tolerance ($t_{r,c}$), where a parameter $R_{c,c}$ is the collision probability. In the embodiment, the recoater tolerance ($t_{r,c}$) is related to the type of recoater, the powder laying mechanism, and the driving mechanism of the recoater. In this regard, the recoater 220 is a hard recoater or a soft recoater, the powder layer heights of the printing device 200 are different, or forces or operating speeds that printing device 200 applies to drive the recoater 220 are different. All these respectively correspond to different collision heights and thereby affecting the numerical result of the recoater tolerance ($t_r$). In step S370, the processor 110 predicts the collision risk (the collision probability) between the simulated printing object 410 and the recoater 220 according to the collision risk formula as formula (3), where $t_{r,c}$ represents calibrated recoater tolerance. In other words, after the processor 110 performed the calibration of the collision risk formula of formula (3) according to a sample printed object, the calibrated collision risk formula of formula (3) is effectively adapted to predict the printing collision probability of the recoater 220 and the specific printed object corresponding to the current printing image file.

$$R_{c,c} = \frac{U_z}{(1 + t_{r,c})d_l} \qquad \text{Formula (3)}$$

Figure 5:
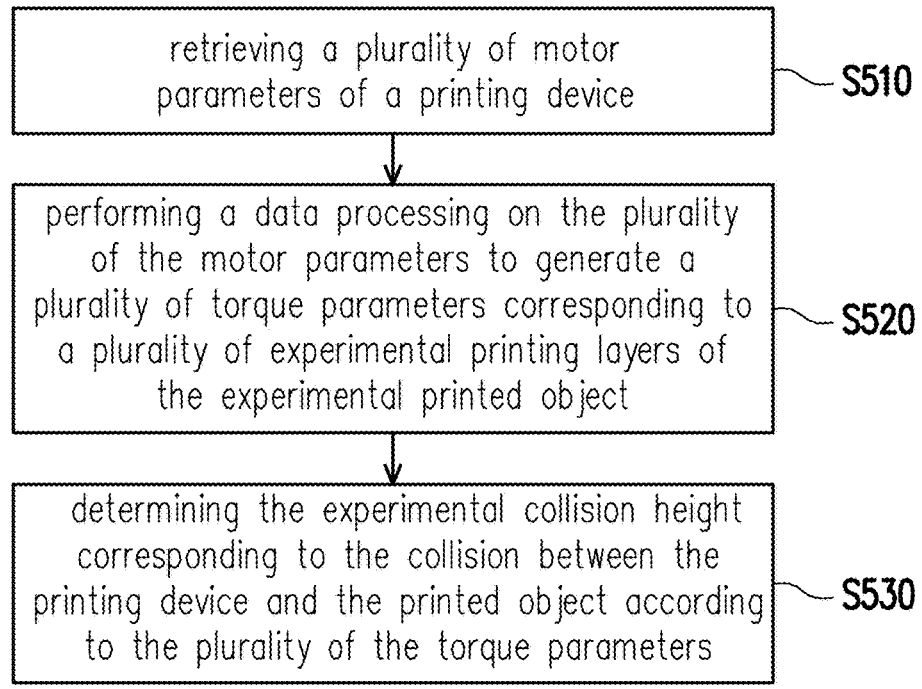
FIG. 5 is a flowchart of obtaining an experimental collision height according to an embodiment of the disclosure.
Figure 6:
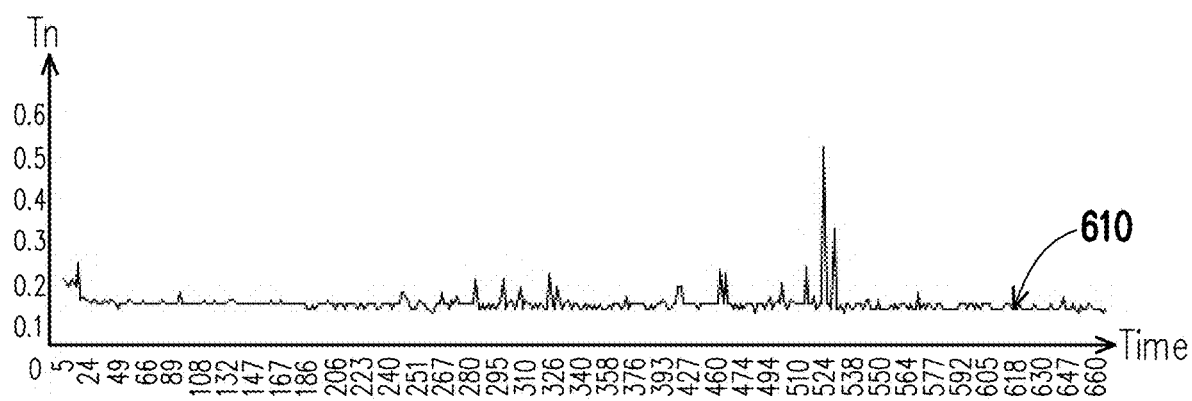
FIG. 6 is a parameter change diagram of a plurality of torque parameters according to an embodiment of the disclosure.

FIG. 5 is a flowchart of obtaining an experimental collision height according to an embodiment of the disclosure. FIG. 6 is a parameter change diagram of a plurality of torque parameters according to an embodiment of the disclosure. Referring to FIG. 1, FIG. 2, FIG. 5, and FIG. 6, steps S510 to S530 in the embodiment are the detailed implementation methods of step S330 in FIG. 3. In the embodiment, since the recoater 220 is a hard recoater, the recoater collision prediction and calibration system 100 determines whether a collision happens between the recoater 220 and the experimental printed object by analyzing the change in the output torque of the rotating shaft of the motor that drives the recoater 220. Specifically, in step S510, the processor 110 records a plurality of motor parameters of the motor in the process of printing the experimental printed object. The plurality of motor parameters may, for example, include a plurality of torque parameters and/or a plurality of rotation speed parameters of the motor in the process of printing the experimental printed object. In step S520, the processor 110 performs data processing on the plurality of motor parameters, such as normalization processing or layering processing, to generate a plurality of torque parameters corresponding to a plurality of experimental printing layers of the experimental printed object. As shown in FIG. 6, the processor 110 performs data processing on the plurality of motor parameters to generate a parameter change 610 corresponding to the maximum torque parameter of each experimental printing layer. In step S530, the processor 110 determines the experimental collision height corresponding to the collision between the recoater 220 and the experimental printed object according to the plurality of torque parameters of the parameter change 610 in FIG. 6. In the embodiment, the processor 110 performs formula (4) to determine whether a collision happens between the recoater 220 and the experimental printed object, where $T_{max}$ is the maximum output torque of the motor.

$$T_n = \frac{T}{T_{max}} \qquad \text{Formula (4)}$$

Referring to a collision determining parameter $T_n$ in formula (4), when the value of one (T) of the plurality of the torque parameters corresponding to the plurality of the experimental printing layers divided by the maximum output torque of the motor ($T_{max}$) is greater than a preset threshold (e.g., $T_n > 0.3$), then the processor 110 determines that a collision happens to one of the plurality of the experimental printing layers corresponding to the one (T) of the plurality of the torque parameters. Therefore, the processor 110 obtains the experimental collision height according to the one of the plurality of the experimental printing layers determined to have a collision.

Figure 7:
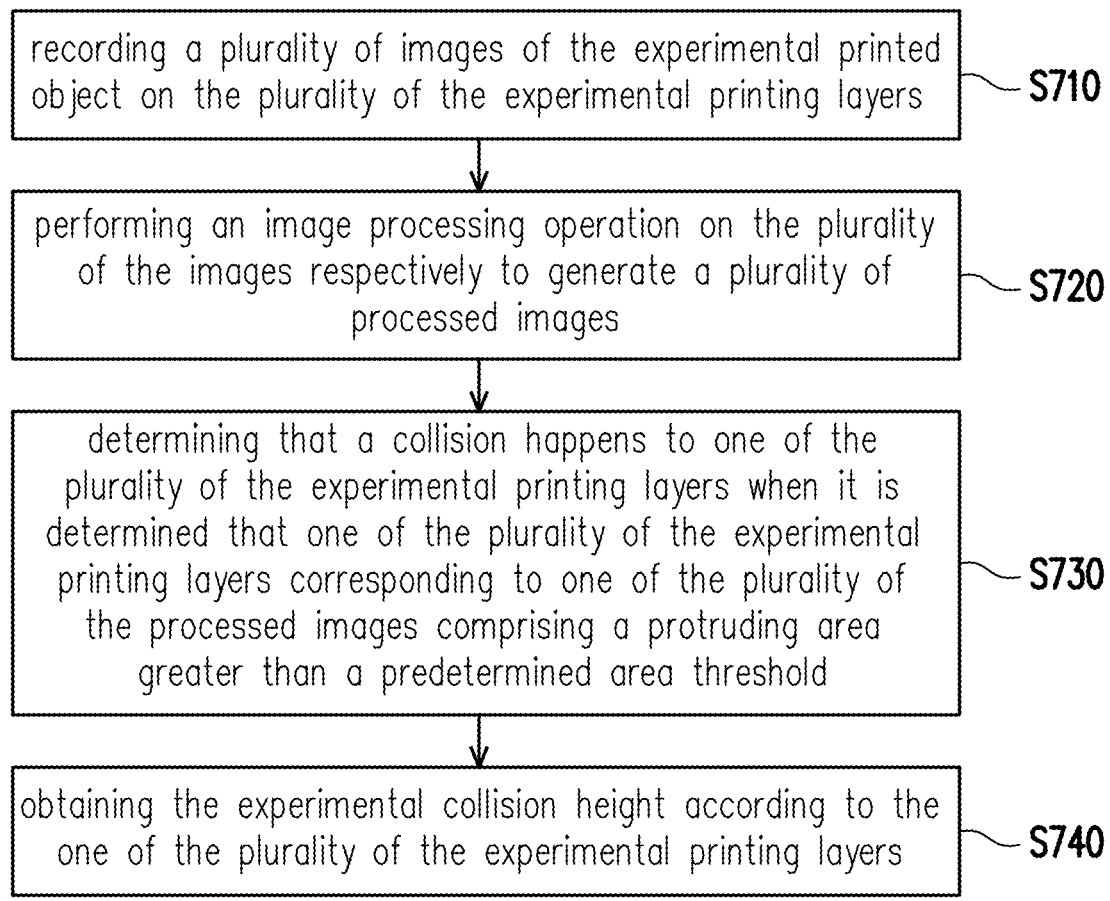
FIG. 7 is a flowchart of obtaining an experimental collision height according to another embodiment of the disclosure.

FIG. 7 is a flowchart of obtaining an experimental collision height according to another embodiment of the disclosure. Referring to FIG. 1, FIG. 2, and FIG. 7, steps S710 to S740 in the embodiment are the detailed implementation methods of step S330 in FIG. 3. In the embodiment, since the recoater 220 is a soft recoater, the recoater collision prediction and calibration system 100 may not easily detect the collision between the recoater 220 and the experimental printed object. In this regard, the recoater collision prediction and calibration system 100 uses image analysis to determine whether a collision happens between the recoater 220 and the experimental printed object. Specifically, the recoater collision prediction and calibration system 100 further includes an image capturing device, and the image capturing device is coupled to the processor 110. In step S710, the processor 110 takes samples through the image capturing device to record a plurality of images of the plurality of the experimental printing layers of the experimental printed object. In step S720, the processor 110 performs an image processing operation on the plurality of images respectively to generate a plurality of processed images. In the embodiment, the image processing operation may include, for example, image area reduction processing, partial image segmentation processing, and binarization processing. In step S730, the processor 110 determines that a collision happens to one of the plurality of the experimental printing layers when the processor 110 determines that one of the plurality of the experimental printing layers corresponding to one of the plurality of processed images has a protruding area greater than a predetermined area threshold. In step S740, the processor 110 obtains the experimental collision height according to the one of the plurality of the experimental printing layers. In other words, the object height corresponding to the current printed experimental printing layer determined to have a collision through an image analysis is used as the experimental collision height through the processor 110.

Figure 8:
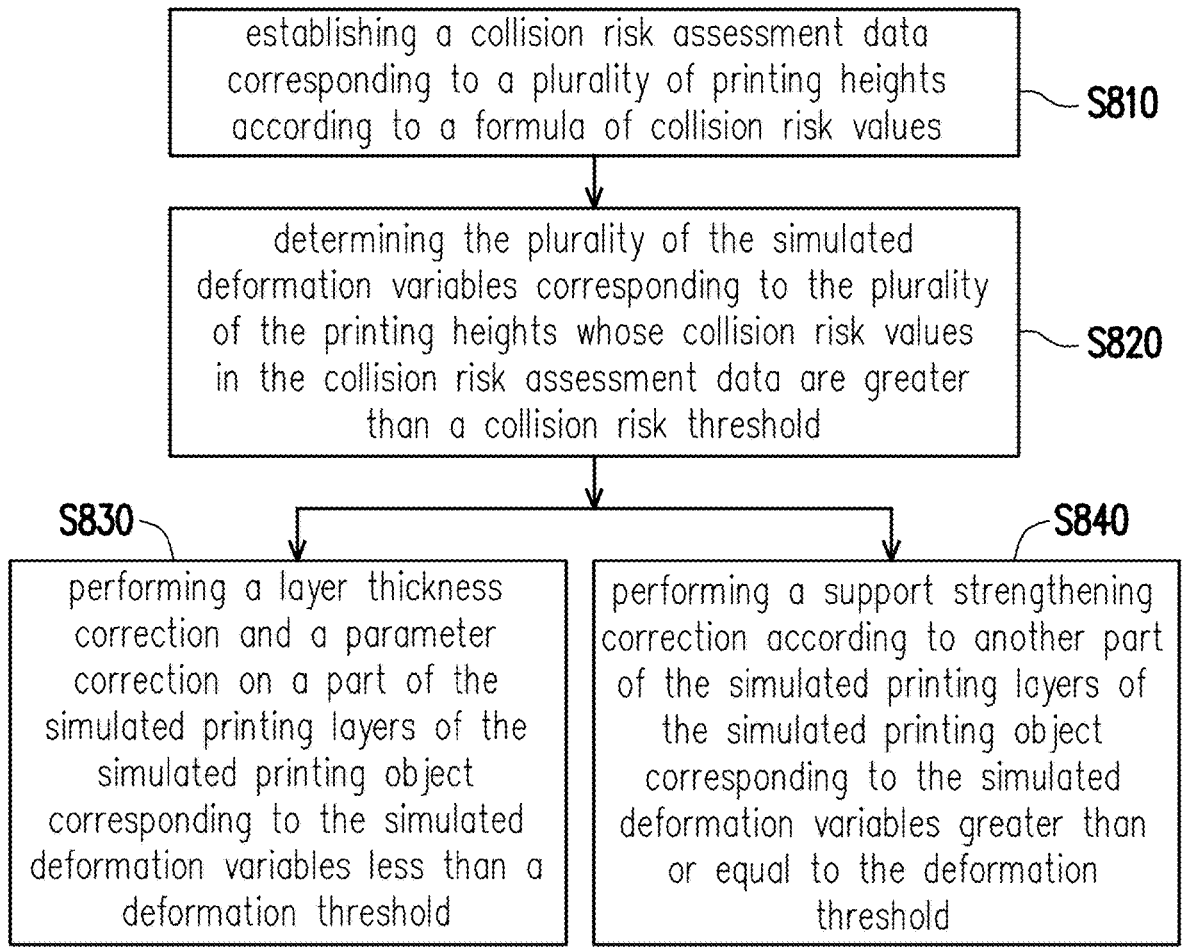
FIG. 8 is a flowchart of a recoater collision prediction and calibration method according to another embodiment of the disclosure.
Figure 9:
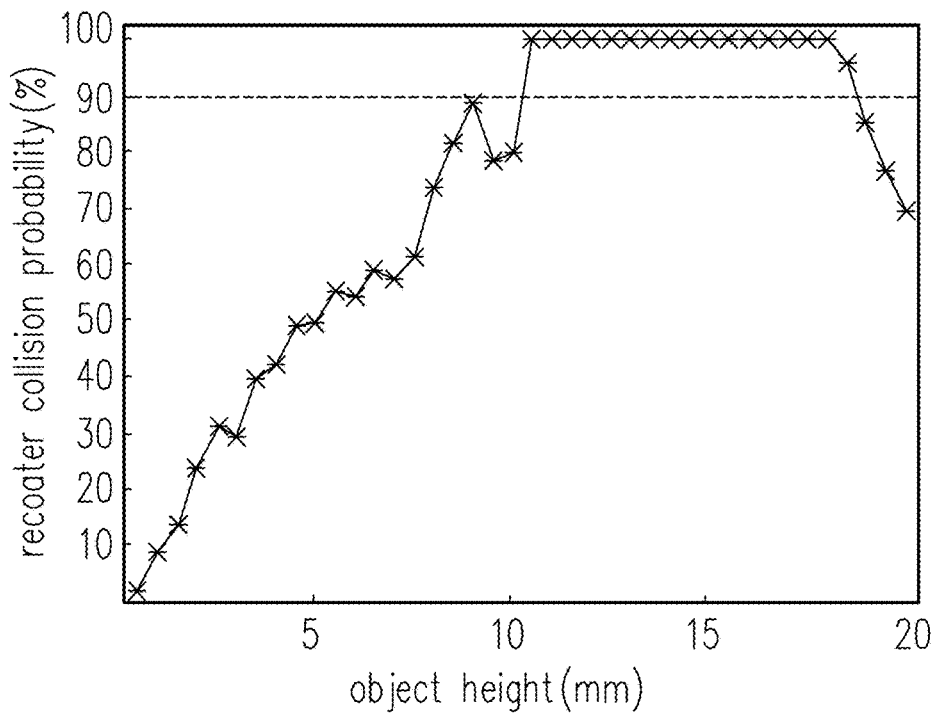
FIG. 9 is a schematic view of a recoater collision prediction data according to an embodiment of the disclosure.
Figure 10:
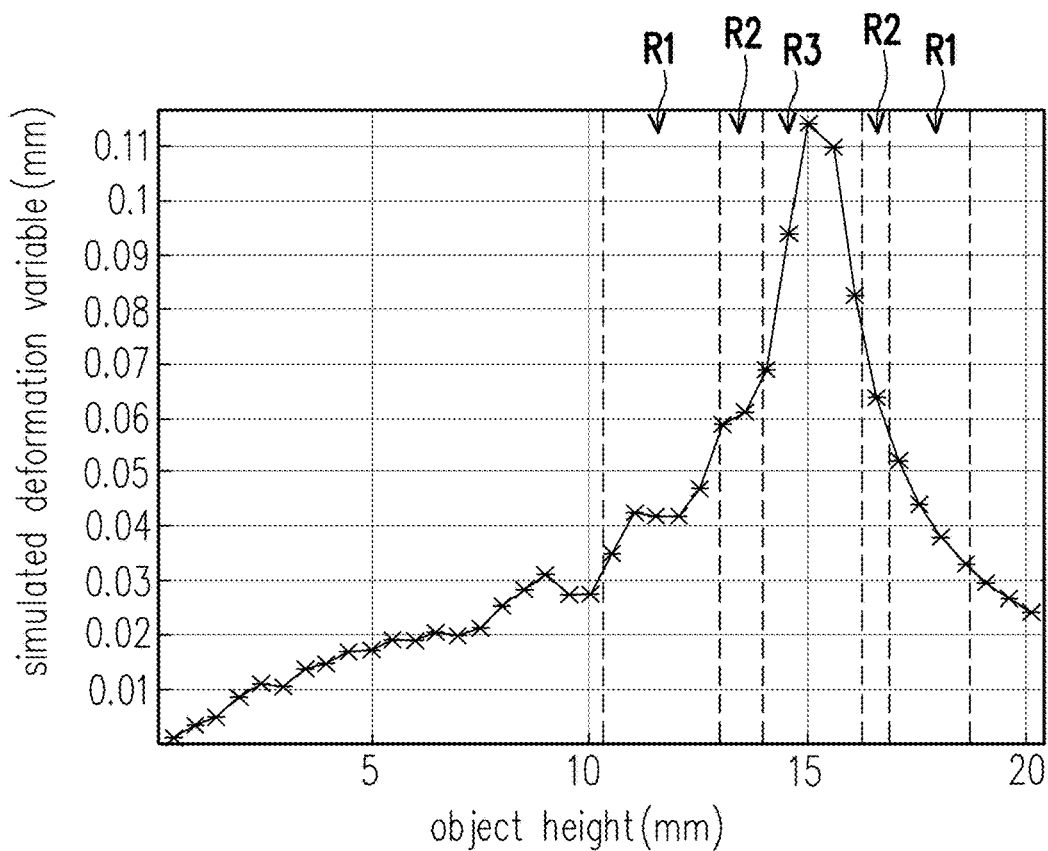
FIG. 10 is a diagram illustrating the relationship between simulated deformation variables and an object height according to an embodiment of the disclosure.

FIG. 8 is a flowchart of a recoater collision prediction and calibration method according to another embodiment of the disclosure. FIG. 9 is a schematic view of a recoater collision prediction data according to an embodiment of the disclosure. FIG. 10 is a diagram illustrating the relationship between simulated deformation variables and the object height according to an embodiment of the disclosure. Referring to FIG. 1 and FIG. 8 to FIG. 10, steps S810 to S840 in the embodiment are the subsequent steps of step S370 in FIG. 3. In step S810, the processor 110 establishes the recoater collision prediction data corresponding to a plurality of printing heights as shown in FIG. 9 according to the collision risk formula of formula (3) calibrated. As shown in FIG. 9, the processor 110 performs the recoater collision prediction and calibration corresponding to the different object heights of the simulated printing object (the simulated printing object 410 shown in FIG. 4A and FIG. 4B) respectively, so as to obtain multiple sets of collision probability corresponding to the different object heights as shown in FIG. 9. In this regard, as shown in FIG. 9, during the printing process of the simulated printing object, when the object height ranges from 10.5 mm to 18.5 mm, there is a 90% chance that the simulated printing object has collided with the recoater. From FIG. 10, it is known that when the object height ranges from 10.5 mm to 18.5 mm, the deformation variables increase significantly, and thus it is easy for the recoater to collide with the printed object during the powder spreading process.

In the embodiment, the processor 110 performs the process thermal stress simulation on prediction results of each layer of the simulation printing layers of the simulated printing object respectively, so as to obtain the simulated deformation variable corresponding to each simulated printing layer in the vertical direction. In step S820, the processor 110 determines the plurality of the simulated deformation variables corresponding to the plurality of the printing heights whose multiple collision risk values in the recoater collision prediction data are greater than a collision risk threshold. In an embodiment, the collision risk threshold may be 90%, for example. The processor 110 may further determine the plurality of the simulated deformation variables corresponding to multiple object heights (10.5 mm to 18.5 mm) with a collision risk threshold greater than 90%.

In step S830, the processor 110 may perform a layer thickness correction and a process parameter correction on a part of the simulated printing layers of the simulated printing object corresponding to the plurality of the simulated deformation variables less than a deformation threshold. The process parameters may be, for example, a laser scanning speed, laser power, etc. In one embodiment, the deformation threshold may be, for example, 0.15 mm. Therefore, as shown in FIG. 10, the simulated deformation variables corresponding to the object heights from 10.5 mm to 18.5 mm are all less than 0.15 mm, so the printed objects corresponding to the object height ranging from 10.5 mm to 18.5 mm are able to reduce the collision risk by adjusting the layer thickness. For example, the processor 110 may further divide the range of the object height ranging from 10 mm to 18.5 mm into ranges R1 to R3 and adjust the layer thickness of the ranges R1 to R3 according to formulas (5) to (7). The range R1 are, for example, two ranges of either an object height ranging from 10.5 mm to 13 mm or an object height ranging from 16.5 mm to 18.5 mm respectively. The range R2 are, for example, two ranges of either an object height ranging from 13 mm to 14 mm or an object height ranging from 16 mm to 16.5 mm respectively. The range R3 is, for example, a range of an object height ranging from 14 mm to 16 mm. In addition, the range R1 is applicable to the layer thickness adjustment formula (i=1) of formula (5), where a parameter $d_{l0}$ is the initial layer thickness, and a parameter $d_{l1}$ represents the layer thickness after the first adjustment. The ranges R2 and R3 are applicable to the layer thickness adjustment formulas (i=2, 3, 4 . . . ) of formulas (6) and (7), where a parameter β may be greater than 0.5 and less than 1 (0.5<β<1.0). For example, in one embodiment, the parameter β may be 0.8, for example, and the parameter $U_z$ is the deformation variable of the uppermost layer of the current simulation in the vertical direction. Note that when i is greater than 1 (i.e., i=2, 3, 4 . . . ), adopting formula (5) or formula (6) to define the layer thickness after the i-th adjustment is determined according to the relationship between the layer thickness and the deformation variable $U_z$ at the i-th adjustment and those at the i−1th adjustment.

$$d_{l1}=(1+i)*d_{l0}=2*d_{l0} \quad \text{Formula (5)}$$

$$U_z>\beta d_{li}, d_{l(i+1)}=(1+i)*d_{l0} \quad \text{Formula (6)}$$

$$U_z<\beta d_{l(i-1)}, d_{l(i+1)}=d_{li}-d_{l0} \quad \text{Formula (7)}$$

In step 840, the processor 110 performs a support strengthening correction on another part of the simulated printing layers of the simulated printing object corresponding to the plurality of the simulated deformation variables greater than or equal to the deformation threshold. In other words, when the simulated deformation variable is greater than or equal to the deformation threshold, it means that the deformation caused by heating leads to collision cannot be improved by modifying the layer thickness of the printing layer. Therefore, the processor 110 of the embodiment increases the support by increasing the printing volume of the supporting object.

In addition, note that after the recoater collision prediction and calibration system 100 in the disclosure completes the recoater collision prediction and calibration in steps S810 to S840, with the printing device 200 whose recoater tolerance has been calibrated or the printing device 200 using the same type of recoater that does not need to be calibrated, the simulation prediction can be performed on any printed objects. In other words, for the same type of recoater, the printing device 200 only needs to be calibrated once. Subsequently, if the same printing device 200 uses this type of recoater to print different printing image files used by different objects, there is no need to calibrate it again.

Figure 11A:
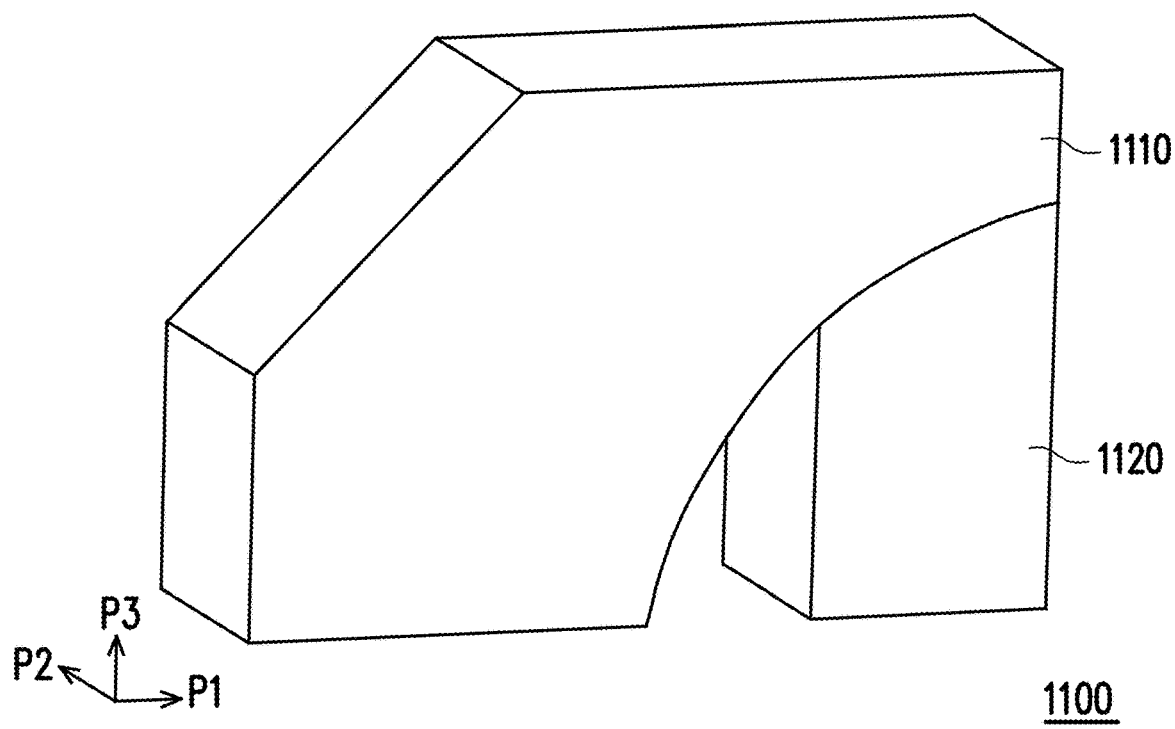
FIG. 11A is a schematic view of a simulated printing object and a supporting object according to an embodiment of the disclosure.
Figure 11B:
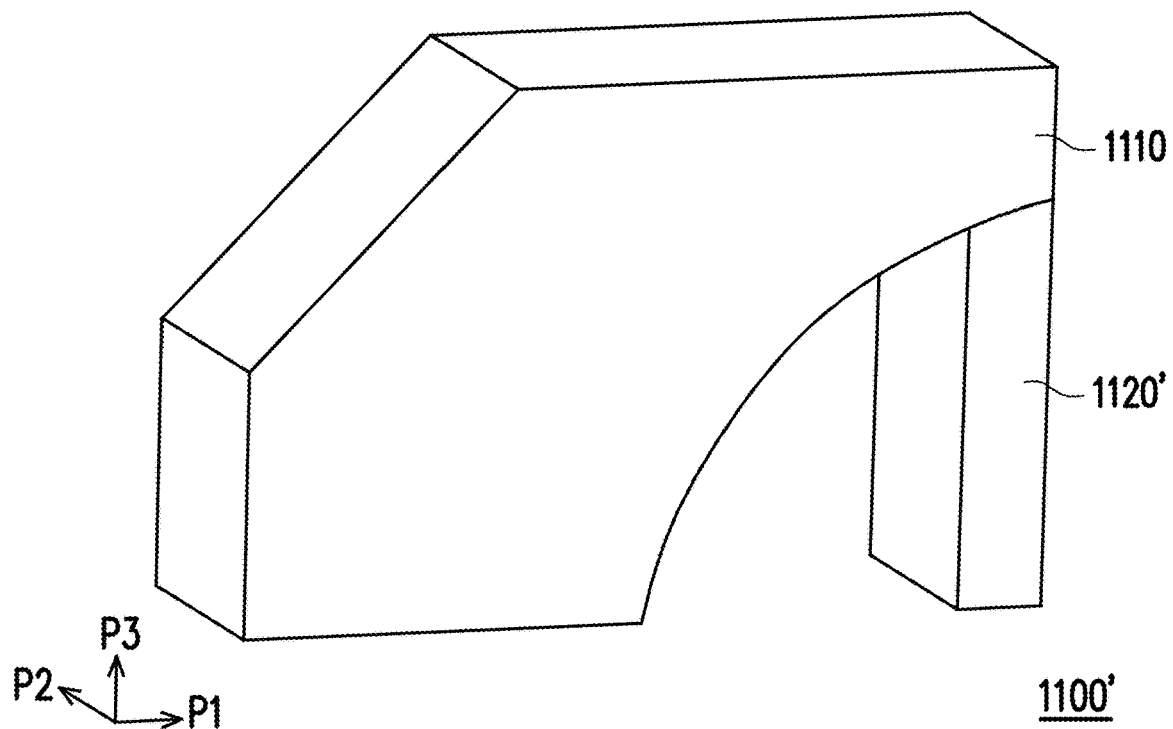
FIG. 11B is a schematic view of a simulated printing object and a supporting object according to another embodiment of the disclosure.

FIG. 11A is a schematic view of a simulated printing object and a supporting object according to an embodiment of the disclosure. FIG. 11B is a schematic view of a simulated printing object and a supporting object according to another embodiment of the disclosure. Referring to FIG. 1, FIG. 11A and FIG. 11B, in step S840, when the simulated deformation variable is greater than or equal to the deformation threshold, the processor 110 in the embodiment adjusts the size of the supporting object 1120 of the simulated printing object 1100 (i.e., calibrate or modify the printing image file). As shown in FIG. 11A, the processor 110 may, for example, increase the width of the supporting object 1120 so that the supporting object 1120 reduces the increasing deformation variable of the object body 1110 of the simulated printing object 1100 in the direction P3 (the vertical direction) due to being heated. Conversely, in another embodiment, when the simulated deformation variable is less than the deformation threshold, the processor 110 in the embodiment adjusts the layer thickness of a part of the simulated printing object 1100' and adjusts the size of the supporting object 1120' of the simulated printing object 1100' (i.e., calibrate or modify the printing image file). As shown in FIG. 11B, for example, the processor 110 reduces the width of the supporting object 1120', so that the printing time (the printing time for the supporting object 1120') is reduced during the printing process of the actual additive manufacturing.

Based on the above, in the disclosure, the recoater collision prediction and calibration method for additive manufacturing and the system thereof are capable of generating simulated printing objects and simulating the deformation of the printed objects during the heating process of printing to obtain the simulated deformation variable. Moreover, in the disclosure the recoater collision prediction and calibration method for additive manufacturing and the system thereof are capable of detecting the collision time between the experimental printed object and the recoater to obtain the experimental collision height. Therefore, in the disclosure, the recoater collision prediction and calibration method for additive manufacturing and the system thereof are capable of using the simulated deformation variable and the experimental collision height to calibrate the collision risk formula, so that the calibrated collision risk formula is capable of effectively predicting the collision probability and time point of the printed object and the recoater in actual situation. Moreover, in the disclosure, the recoater collision prediction and calibration method for additive manufacturing and the system thereof are also capable of calibrating the related parameters of the printed object according to the collision prediction result, so as to effectively reduce the probability of collision between the recoater and the printed object during the actual printing process.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:
1. A recoater collision prediction and calibration method for additive manufacturing, comprising:
loading a printing image file to generate a simulated printing object according to the printing image file;
performing a process thermal stress simulation on the simulated printing object to obtain a plurality of simulated deformation variables respectively corresponding to a plurality of prediction results of the simulated printing object in a vertical direction on each layer;
obtaining an experimental collision height of an experimental printed object colliding with a recoater;
selecting one of the plurality of simulated deformation variables according to the experimental collision height;
calculating a recoater tolerance according to the one of the plurality of simulated deformation variables selected, wherein the plurality of simulated deformation variables includes a type of recoater, a powder laying mechanism, and a driving mechanism of the recoater;
calibrating a collision risk formula according to the recoater tolerance; and
predicting a collision risk value between the simulated printing object and the recoater according to the collision risk formula.

2. The recoater collision prediction and calibration method according to claim 1, wherein a printing device comprises a hard recoater, and the step of obtaining the experimental collision height of the experimental printed object colliding with the recoater comprises:
retrieving a plurality of motor parameters of the printing device;
performing a data processing on the plurality of motor parameters to generate a plurality of torque parameters corresponding to a plurality of experimental printing layers of the experimental printed object; and
determining the experimental collision height corresponding to the collision between the printing device and a printed object according to the plurality of the torque parameters.

3. The recoater collision prediction and calibration method according to claim 2, wherein the step of determining the experimental collision height corresponding to the collision between the printing device and the printed object according to the plurality of the torque parameters comprises:
determining that a collision happens to one of the plurality of the experimental printing layers corresponding to one of the plurality of the torque parameters when a value of one of the plurality of the torque parameters of the plurality of the experimental printing layers divided by a maximum output torque of a motor is greater than a preset threshold; and
obtaining the experimental collision height according to the one of the plurality of the experimental printing layers.

4. The recoater collision prediction and calibration method according to claim 1, wherein a printing device comprises a soft recoater, the step of obtaining the experimental collision height of the experimental printed object colliding with the recoater comprises:
recording a plurality of images of the experimental printed object on the plurality of the experimental printing layers;
performing an image processing operation on the plurality of the images respectively to generate a plurality of processed images;
determining that a collision happens to one of the plurality of the experimental printing layers when it is determined that one of the plurality of the experimental printing layers corresponding to one of the plurality of the processed images comprising a protruding area greater than a predetermined area threshold; and
obtaining the experimental collision height according to the one of the plurality of the experimental printing layers.

5. The recoater collision prediction and calibration method according to claim 4, wherein the image processing operation comprises an image area reduction process, a partial image segmentation process, or a binarization process.

6. The recoater collision prediction and calibration method according to claim 1, wherein the step of selecting the one of the plurality of the simulated deformation variables according to the experimental collision height comprises:
obtaining a simulated collision height closest to the experimental collision height according to the experimental collision height; and
selecting one of the plurality of the simulated deformation variables according to the simulated collision height.

7. The recoater collision prediction and calibration method according to claim 1, wherein the step of predicting the collision risk value between the simulated printing object and the recoater according to the collision risk formula comprises:
establishing a recoater collision prediction data corresponding to a plurality of printing heights according to the collision risk formula.

8. The recoater collision prediction and calibration method according to claim 7, further comprising:
determining the plurality of the simulated deformation variables corresponding to the plurality of the printing heights whose collision risk values in the recoater collision prediction data are greater than a collision risk threshold; and
performing a layer thickness correction and a parameter correction on a part of the plurality of the simulated printing layers of the simulated printing object corresponding to a part of the plurality of the simulated deformation variables less than a deformation threshold.

9. The recoater collision prediction and calibration method according to claim 8, wherein the parameter correction is to modify at least one of a laser scanning speed and laser power adapted for additive manufacturing.

10. The recoater collision prediction and calibration method according to claim 7, further comprising:
determining the plurality of the simulated deformation variables corresponding to the plurality of the printing heights whose collision risk values in the recoater collision prediction data are greater than a collision risk threshold; and
performing a support strengthening correction according to another part of the plurality of the simulated printing layers of the simulated printing object corresponding to the plurality of the simulated deformation variables greater than or equal to the deformation threshold.

11. A recoater collision prediction and calibration system for additive manufacturing, comprising:
a memory for storing a simulating module and a computing module; and
a processor coupled to the memory and adapted to execute the simulating module and the computing module to perform following operations:
loading a printing image file through the processor to generate a simulated printing object according to the printing image file;
performing a thermal stress simulation on the simulated printing object through the processor to obtain a plurality of simulated deformation variables respectively corresponding to a plurality of prediction results of the simulated printing object in a vertical direction on each layer;
obtaining an experimental collision height of an experimental printed object colliding with a recoater through the processor;
selecting one of the plurality of the simulated deformation variables according to the experimental collision height through the processor;
calculating a recoater tolerance according to the one of the plurality of the simulated deformation variables selected through the processor, wherein the plurality of simulated deformation variables includes a type of recoater, a powder laying mechanism, and a driving mechanism of the recoater;
calibrating a collision risk formula according to the recoater tolerance through the processor; and predicting a collision risk value between the simulated printing object and the recoater according to the collision risk formula through the processor.

12. The recoater collision prediction and calibration system according to claim 11, wherein a printing device comprises a hard recoater, and the operation of obtaining the experimental collision height of the experimental printed object colliding with the recoater through the processor comprises followings:

retrieving a plurality of motor parameters of the printing device through the processor;

performing a data processing on the plurality of the motor parameters through the processor to generate a plurality of torque parameters corresponding to a plurality of experimental printing layers of the experimental printed object; and determining the experimental collision height corresponding to the collision between the printing device and a printed object according to the plurality of the torque parameters.

13. The recoater collision prediction and calibration system according to claim 12, wherein the operation of determining the experimental collision height corresponding to the collision between the printing device and the printed object through the processor according to the plurality of the torque parameters comprises:

determining that a collision happens to one of the plurality of the experimental printing layers corresponding to one of the plurality of the torque parameters through the processor when a value of one of the plurality of the torque parameters of the plurality of the experimental printing layers divided by a maximum output torque of a motor is greater than a preset threshold; and obtaining the experimental collision height through the processor according to the one of the plurality of the experimental printing layers.

14. The recoater collision prediction and calibration system according to claim 11, wherein a printing device comprises a soft recoater, and the operation of obtaining the experimental collision height of the experimental printed object colliding with the recoater through the processor comprises:

recording a plurality of images of the experimental printed object on the plurality of the experimental printing layers through the processor;

performing an image processing operation on the plurality of the images respectively through the processor to generate a plurality of processed images;

determining that a collision happens to one of the plurality of the experimental printing layers through the processor when the processor determines that one of the plurality of the experimental printing layers corresponding to one of the plurality of the processed images comprising a protruding area greater than a predetermined area threshold; and obtaining the experimental collision height according to the one of the plurality of the experimental printing layers through the processor.

15. The recoater collision prediction and calibration system according to claim 14, wherein the image processing operation comprises an image area reduction process, a partial image segmentation process, or a binarization process.

16. The recoater collision prediction and calibration system according to claim 11, wherein the operation of selecting the one of the plurality of the simulated deformation variables through the processor according to the experimental collision height comprises:

obtaining a simulated collision height closest to the experimental collision height through the processor according to the experimental collision height; and selecting one of the plurality of the simulated deformation variables through the processor according to the simulated collision height.

17. The recoater collision prediction and calibration system according to claim 11, wherein the operation of predicting the collision risk value between the simulated printing object and the recoater through the processor according to the collision risk formula comprises:

establishing a recoater collision prediction data corresponding to a plurality of printing heights through the processor according to the collision risk formula.

18. The recoater collision prediction and calibration system according to claim 17, wherein the processor further execute operations as follows:

determining the plurality of the simulated deformation variables corresponding to the plurality of the printing heights whose collision risk values in the recoater collision prediction data are greater than a collision risk threshold through the processor; and performing a layer thickness correction and a parameter correction on a part of the plurality of the simulated printing layers of the simulated printing object corresponding to a part of the plurality of the simulated deformation variables less than a deformation threshold through the processor.

19. The recoater collision prediction and calibration system according to claim 18, wherein the parameter correction comprises modifying at least one of a laser scanning speed and laser power adapted for additive manufacturing.

20. The recoater collision prediction and calibration system according to claim 17, wherein the processor further execute operations as follows:

determining the plurality of the simulated deformation variables corresponding to the plurality of the printing heights whose collision risk values in the recoater collision prediction data are greater than a collision risk threshold through the processor; and performing a support strengthening correction through the processor according to another part of the plurality of the simulated printing layers of the simulated printing object corresponding to the plurality of the simulated deformation variables greater than or equal to the deformation threshold.

* * * * *